(12) United States Patent
Moyer et al.

(10) Patent No.: US 6,449,675 B1
(45) Date of Patent: Sep. 10, 2002

(54) MULTIFIELD REGISTER HAVING A SELECTION FIELD FOR SELECTING A SOURCE OF AN INFORMATION FIELD

(75) Inventors: William C. Moyer, Dripping Springs; Brian D. Branson, Austin, both of TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/342,519

(22) Filed: Jun. 29, 1999

(51) Int. Cl.[7] .............................................. G06F 9/48
(52) U.S. Cl. ...................................................... 710/269
(58) Field of Search ............................... 710/260, 266, 710/268, 48, 269; 712/244

(56) References Cited

U.S. PATENT DOCUMENTS

| | | | | |
|---|---|---|---|---|
| 4,378,589 A | * | 3/1983 | Finnegan et al. ............... | 712/2 |
| 4,398,245 A | * | 8/1983 | Fujita .......................... | 711/214 |
| 5,155,853 A | * | 10/1992 | Mitsuhira et al. ............ | 710/261 |
| 5,325,341 A | * | 6/1994 | Viot et al. .................... | 368/113 |
| 6,154,832 A | * | 11/2000 | Maupin ........................ | 710/260 |

FOREIGN PATENT DOCUMENTS

JP 08044572 A * 2/1996 ............. G06F/9/46

OTHER PUBLICATIONS

Motorola, Inc., *MCoreTM MMC2001 Reference Manual*, MMC1001RM/D, Section 10 Interrupt Contoller, pp. 10–1 through 10–6 (1998).

* cited by examiner

Primary Examiner—Glenn A. Auve
(74) Attorney, Agent, or Firm—Susan C. Hill

(57) ABSTRACT

A data processing system (10) has a multifield register (62) which has two fields, a selection field (90) and an information field (91). The selection field (90) identifies the source of the information loaded in the information field (91). In one embodiment, the multifield register (62) is an interrupt flag register (62) and the selection field (90) identifies which of the two registers portions (59,60) of the interrupt pending register (58) is loaded into the multifield register (62). The low register portion (59) can identify up to thirty-one sources of interrupt requests and the high register portion (60) can identify up to thirty-two sources of interrupt requests even though the information field (91) is only thirty-one bits. This is achievable because the selection field (90) may serves a dual function, namely as a flag bit and as bit-32 of the interrupt pending register (58).

20 Claims, 3 Drawing Sheets

MULTIFIELD REGISTER HAVING A SELECTION FIELD FOR SELECTING A SOURCE OF AN INFORMATION FIELD

FIELD OF THE INVENTION

The present invention relates in general to a multifield register, and more particularly to a multifield register having a selection field for selecting a source of an information field.

BACKGROUND OF THE INVENTION

Interrupts are commonly used today in data processing systems, especially in many real-time control applications. The amount of time it takes the data processing system to respond to an interrupt is called the "interrupt latency time". In most data processing systems, it is desirable to have the shortest possible interrupt latency time without reducing the normal operating performance of the data processing system. The interrupt latency time is affected by many software and hardware components of a data processing system, including the processor overhead required to enter the appropriate interrupt handler. An interrupt handler is generally a software routine used to "handle" or respond to that particular interrupt.

In many real-time control applications, there are a large number of potential interrupt sources. Indeed, the number of potential interrupt sources is growing as integrated circuits are moving toward becoming larger and more complex and are incorporating entire "systems-on-a-chip" on a single integrated circuit. In general, interrupt controllers are used to provide masking and prioritization of multiple interrupt sources in a data processing system. Interrupt controllers may range from simple software based schemes using auto-vectored interrupts and a software prioritization and dispatch method, to large, complex hardware schemes with multiple priority levels and vectoring capability.

For many application, what is desired is an interrupt handling implementation that is a compromise between the complexity and large amount of circuitry required for a purely hardware scheme, and the overhead and thus increased interrupt latency time required for a purely software scheme. Such a compromise between increased circuitry (i.e. increased semiconductor area) and increased interrupt latency time is especially necessary when the number of interrupt sources is large. What is needed is a simple hardware assist mechanism that can improve the performance of software interrupt handling schemes while requiring minimal circuitry.

DETAILED DESCRIPTION

The minimization of interrupt latency time in a data processing system is crucial for many real-time control applications. The present invention provides a simple hardware assist mechanism that can improve the performance of software interrupt handling schemes while requiring minimal circuitry.

Figure 1:
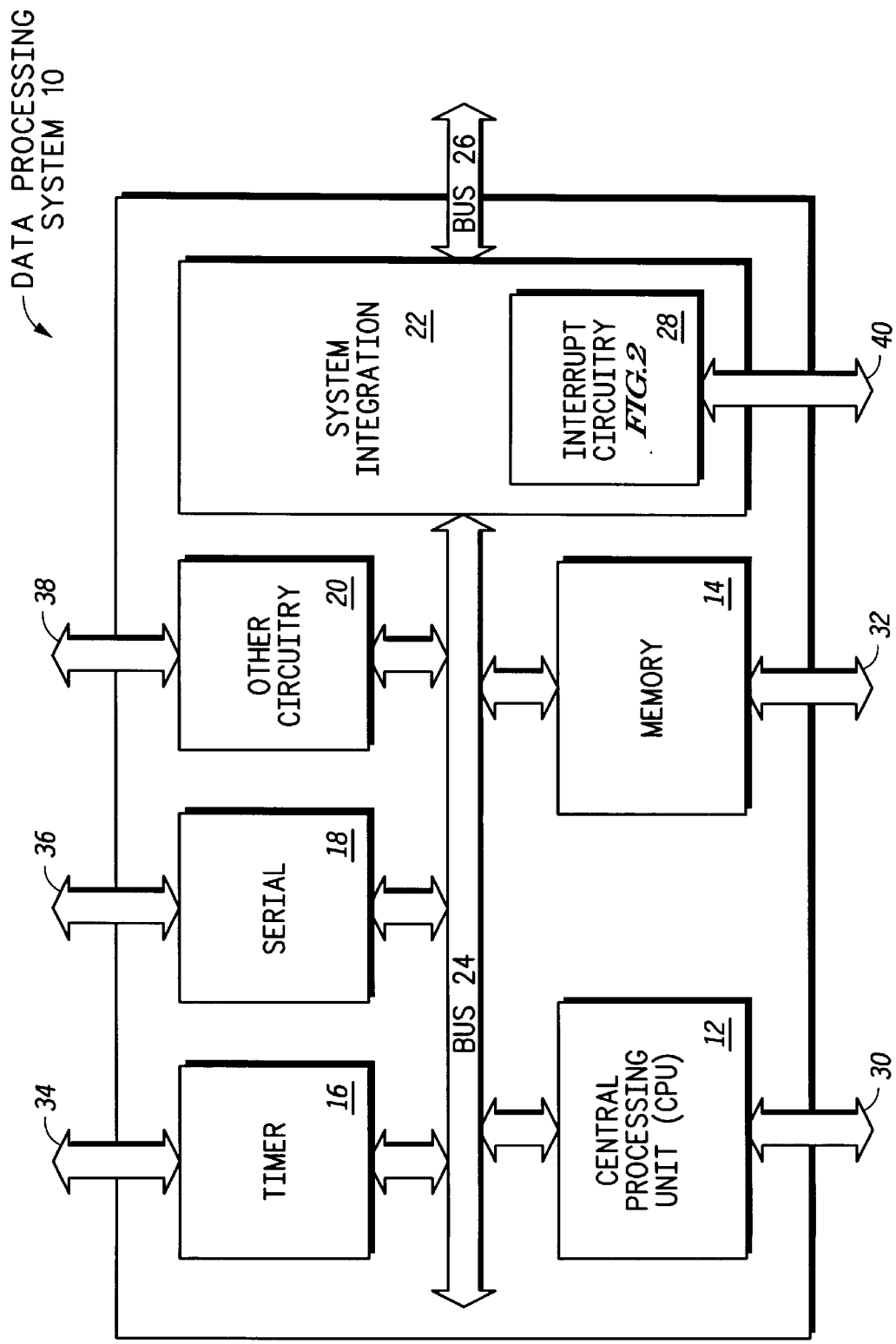
FIG. 1 illustrates, in block diagram form, a data processing system 10 in accordance with one embodiment of the present invention.

FIG. 1 illustrates a data processing system 10 having central processing unit (CPU) circuitry 12, memory circuitry 14, timer circuitry 16, serial circuitry 18, other circuitry 20, and system integration circuitry 22, which are all bi-directionally coupled to each other by way of bus 24.

CPU 12 may be coupled external to data processing system 10 by way of one or more integrated circuit terminals 30. Memory 14 may be coupled external to data processing system 10 by way of one or more integrated circuit terminals 32. Timer 16 may be coupled external to data processing system 10 by way of one or more integrated circuit terminals 34. Serial circuitry 18 may be coupled external to data processing system 10 by way of one or more integrated circuit terminals 36. And, other circuitry 20 may be coupled external to data processing system 10 by way of one or more integrated circuit terminals 38. System integration circuitry 22 is bi-directionally coupled external to data processing system 10 by way of bus 26. System integration circuitry 22 includes interrupt circuitry 28. Interrupt circuitry 28 may be coupled external to data processing system 10 by way of integrated circuit terminals 40, and may be coupled to CPU 12 by way of bus 24.

In some embodiments of the present invention, data processing system 10 is a data processor which is formed on a single integrated circuit. In some embodiment, data processing system 10 is a single chip microcontroller. In alternate embodiments, data processing system 10 may be implemented using any type of electrical circuitry. Memory 14 may be any type of memory. Alternate embodiments of data processing system 10 may include more, fewer, or different blocks of circuitry. For example, alternate embodiments of data processing system 10 may not have memory 14, timer 16, serial 18, or other circuitry 20. Some embodiments of the present invention may include the interrupt circuitry 28 as part of CPU 12, and may or may not have system integration circuitry 22.

Integrated circuit terminals 30, 32, 34, 36, 38, and 40 may be any type of apparatus which allows electrical signals to be transferred to or from data processing system 10. For example, integrated circuit terminals 30, 32, 34, 36, 38, and 40 may be integrated circuit pins, solder bumps, wire conductors, etc. In addition, bus 26 may conduct electrical signals to and from data processing system 10 by way of integrated circuit terminals.

Figure 2:
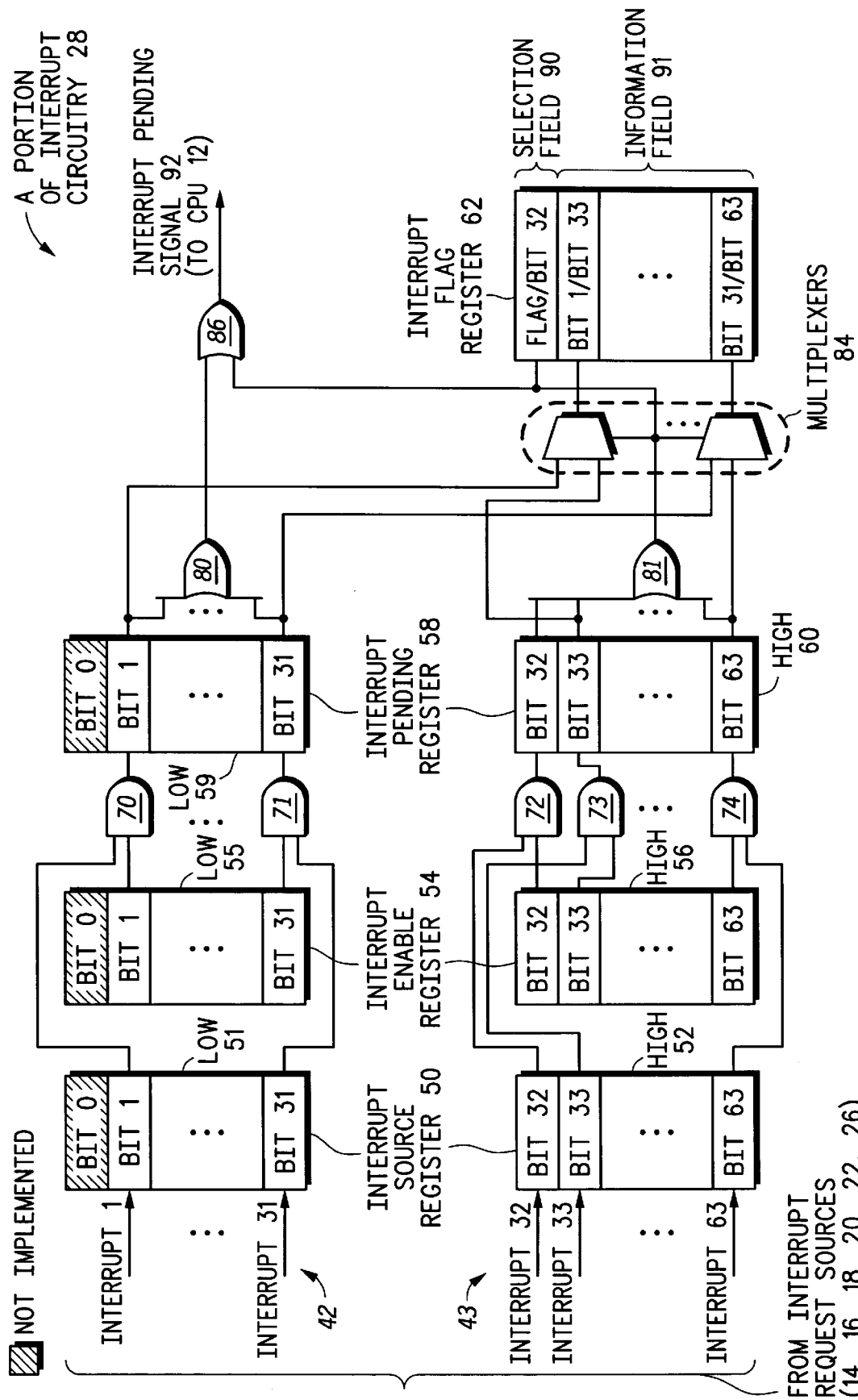
FIG. 2 illustrates, in block diagram form, a portion of interrupt circuitry 28 of FIG. 1 in accordance with one embodiment of the present invention.

FIG. 2 illustrates a portion of interrupt circuitry 28 of FIG. 1 in accordance with one embodiment of the present invention. In one embodiment of the present invention, interrupt circuitry 28 includes an interrupt source register 50, an interrupt enable register 54, an interrupt pending register 58, and an interrupt flag register 62. The interrupt source register 50 is partitioned into two portions, namely a low portion 51 and a high portion 52. The interrupt enable register 54 is partitioned into two portions, namely a low portion 55 and a high portion 56. And similarly, the interrupt pending register 58 is partitioned into two portions, namely a low portion 59 and a high portion 60. In one embodiment of the present invention, the low portions 51, 55, and 59 of the corresponding registers 50, 54, and 58 each include bit-1 through bit-31 while bit-0 is not implemented. In one embodiment of the present invention, the high portions 52, 56, and 60 of the corresponding registers 50, 54, and 58 each include bit-32 through bit-63. Alternate embodiments of the present invention may include any number of bits in register 50, 54, and 58, and alternate embodiments of the present invention may implement bit-0.

In one embodiment of the present invention, interrupt flag register 62 includes thirty-two bits and is partitioned into two bit fields, namely a selection field 90 and an information field 91. Alternate embodiments of the present invention may use more or different register bit fields. In addition, alternate embodiments of interrupt flag register 62 may also include register bit fields which are used for status, data, or control, or any combination of status, data, and control. In addition, alternate embodiment of the present invention may locate the bit fields 90 and 91 in one or more separately addressable registers. Also, different embodiments of the present invention may include any numbers of bits for each of the register bits fields 90, 91 illustrated in FIG. 2. In some embodiments of the present invention, the functionality of one or more of the register bit fields 90, 91 may be combined and encoded into fewer register bit fields or may be decoded and stored in more register bit fields.

In one embodiment, registers 50, 54, 58, and 62 are bi-directionally coupled to bus 24 so that registers 50, 54, 58, and 62 can be accessed by CPU 12 (see FIG. 1). In one embodiment of the present invention, CPU 12 is able to write interrupt enable register 54, whereas registers 50, 58, and 62 are not part of the programmer's model and thus cannot be directly read and written by CPU 12. Instead, registers 50, 58, and 62 may be implemented as storage circuitry (e.g. a latch) or in some cases, as a simple wire conductor (e.g. interrupt source register 50). Alternate embodiments may implement one or more of registers 50, 54, 58, and 62 as registers in the programmer's model, or may implement them as circuitry that is not read and write accessible by CPU 12. Even interrupt enable register 54, which is user programmable, may be programmed during the manufacturing process of data processing system 10 using a mask option, and thus may not need to be read or write accessible to CPU 12. Similarly, the interrupt flag register 62 may be read accessible by CPU 12 so that CPU 12 can determine which one of interrupt signals 42, 43 has the highest priority and should be handled next. Alternately, the information contained in interrupt flag register 62 may be provided to the circuitry responding to interrupts (e.g. CPU 12) in some other manner.

Interrupt signals 42 and 43 indicate that an interrupt request source is requesting an interrupt. In one embodiment, the low portion 51 of interrupt source register 50 receives interrupt signals 42 from interrupt sources which are either internal to data processing system 10 (e.g. 14, 16, 18, 20, 22) or are external to data processing system 10 (e.g. sources not shown that are coupled to bus 26). Similarly, the high portion 52 of interrupt source register 50 receives interrupt signals 43 from interrupt sources which are either internal to data processing system 10 (e.g. 14, 16, 18, 20, 22) or are external to data processing system 10 (e.g. sources not shown that are coupled to bus 26). Alternate embodiments of the present invention may implement any number of interrupt signals 42 and 43. In one embodiment of the present invention, each bit of interrupt source register 50 corresponds to one interrupt request signal 42, 43. Note that in some embodiments of the present invention, one interrupt request source 14, 16, 18, 20, 22, 26 may actually provide multiple interrupt signals 42, 43 to interrupt source register 50, particularly if different interrupt handling software routines will be used to service multiple interrupts from one interrupt request source 14, 16, 18, 20, 22, 26.

Still referring to FIG. 2, bit-1 of interrupt source register 50 is provided as a first input to AND gate 70. Bit-1 of interrupt enable register 54 is provided as a second input to AND gate 70. An output of AND gate 70 is coupled to bit-1 of interrupt pending register 58. Bit-31 of interrupt source register 50 is provided as a first input to AND gate 71. Bit-31 of interrupt enable register 54 is provided as a second input to AND gate 71. An output of AND gate 71 is coupled to bit-31 of interrupt pending register 58. Bit-1 through bit-31 of interrupt pending register 58 are coupled to inputs of OR gate 80. An output of OR gate 80 is coupled to a first input of OR gate 86. Bit-32 of interrupt source register 50 is provided as a first input to AND gate 72. Bit-32 of interrupt enable register 54 is provided as a second input to AND gate 72. An output of AND gate 72 is coupled to bit-32 of interrupt pending register 58. Bit-33 of interrupt source register 50 is provided as a first input to AND gate 73. Bit-33 of interrupt enable register 54 is provided as a second input to AND gate 73. An output of AND gate 73 is coupled to bit-33 of interrupt pending register 58. Bit-63 of interrupt source register 50 is provided as a first input to AND gate 74. Bit-63 of interrupt enable register 54 is provided as a second input to AND gate 74. An output of AND gate 74 is coupled to bit-63 of interrupt pending register 58. Bit-32 through bit-63 of interrupt pending register 58 are coupled to inputs of OR gate 81. An output of OR gate 81 is coupled to a second input of OR gate 86.

In one embodiment of the present invention, multiplexers 84 include one less multiplexer than the number of bits in interrupt flag register 62. The least significant bit (LSB) of the interrupt flag register 62 is coupled to the output of OR gate 81 and is a logic level one when at least one bit in the high portion 60 of interrupt pending register 58 is a logic level one. All of the rest of the bits in interrupt flag register 62, aside from the LSB, are coupled to the output of a corresponding one of multiplexers 84 and receive either a corresponding bit from the low portion 59 or the high portion 60 of interrupt pending register 58. For example, the second least significant bit of interrupt flag register 62 receives either bit-1 or bit-33 from interrupt pending register 58 by way of a corresponding one of multiplexers 84.

Figure 3:
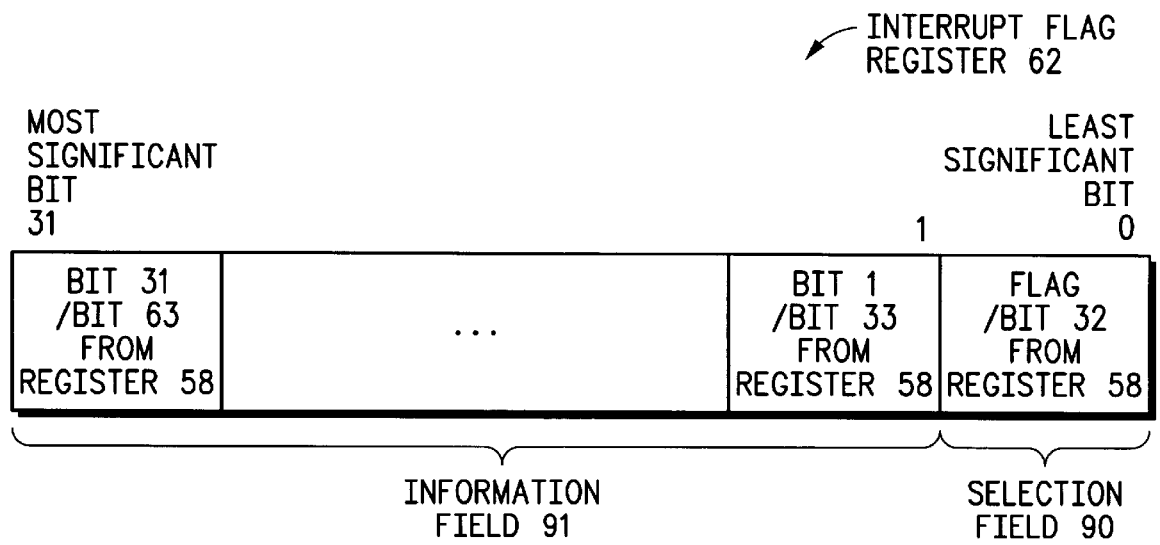
FIG. 3 illustrates, in block diagram form, an interrupt flag register 62 of FIG. 2 in accordance with one embodiment of the present invention.

FIG. 3 illustrates one embodiment of an interrupt flag register 62 of FIG. 2. In the embodiment of the present invention illustrated in FIG. 3, interrupt flag register 62 includes a selection bit field 90 which includes bit-0, and an information register bit field 91 which includes bit-1 through bit-31. Alternate embodiments of the present invention may include any number of bits in selection field 90 and in information field 91.

The operation of one embodiment of the present invention will now be discussed in more detail. The interrupt source register 50 indicates which interrupt request sources (14, 16, 18, 20, 22, 26) have requested an interrupt. Any number of bits in interrupt source register 50 may be asserted at a given time. In one embodiment of the present invention, interrupt source register 50 has a single interrupt source associated with each bit. The interrupt enable register 54 allows individual bit masking of the interrupt source register 50 by allowing the user of data processing system 10 to separately enable or disable each one of the interrupt signals 42, 43. From a functional standpoint, bit-N of the interrupt source register 50 is logically ANDed with the corresponding bit-N of the interrupt enable register 54, and the result of the logical AND operation is stored in the corresponding bit-N of the interrupt pending register 58. In one embodiment of the present invention, the high order bits 60 of interrupt pending register 58 are logically ORed together by ORing circuit 81 and the output of ORing circuit 81 is stored in the least significant bit of the interrupt flag register 62. Note that the output of ORing circuit 81 also provides the selection or control input to multiplexers 84. Thus, the output of ORing circuit 81 determines whether the low order bits 59, or alternately the high order bits 60, of interrupt pending register 58 are loaded into interrupt flag register 62.

In one embodiment of the present invention, the low order bits 59 of the interrupt pending register 58 may thus be considered as a first one of a plurality of multisource registers, and the high order bits 60 of interrupt pending register 58 may be considered as a second one of a plurality of multisource registers. The multisource registers 59, 60 thus act as the source of information that is selectively provided to and stored in information field 91 under control of selection field 90. Interrupt flag register 62 is a multifield register because it includes more than one field, namely information field 91 and selection field 90.

If any one bit in the high order bits 60 of interrupt pending register 58 is a logic level one, then the output of ORing circuit 81 will be a logic level one, and consequently the least significant bit of interrupt flag register 62 will be a logic level one. Also, multiplexers 84 will receive a logic level one as a control signal input that will result in the high order bits 60 of interrupt pending register 58 being loaded into the corresponding bits of interrupt flag register 62, with the exception of the least significant bit of the high order bits 60 of interrupt pending register 58. Note that the least significant bit, bit 32, of the high order bits 60 of interrupt pending register 58 are never provided to interrupt flag register 62. Instead, the output of ORing circuit 81 is provided to the least significant bit of the interrupt flag register 62. Note that if any bit within high order bits 60 of the interrupt pending register 58 are a logic level one, then the least significant bit of the interrupt flag register 62 will be a logic level one.

In some embodiments of the present invention, interrupt prioritization is handled by a software routine in CPU 12. In one embodiment, the software routine executed by CPU 12 reads the interrupt flag register 62 and performs a find-first-one operation to prioritize the interrupt source. Thus the find-first-one operation will find the most significant bit in interrupt flag register 62 which is a logic level one. If an interrupt is pending and bit-33 through bit-63 of interrupt flag register 62 are all a logic level zero, then the least significant bit, the "flag/bit-32" bit, of interrupt flag register 62 will contain a logic level one which acts as both a flag and as the corresponding value of bit-32 of interrupt pending register 58. This dual function for the LSB of interrupt flag register 62 works for the following reason: if bit-32 of the interrupt pending register 58 is the only bit asserted within bit-32 through bit-63 of the interrupt pending register 58, then the least significant bit of the interrupt flag register 62 will be asserted and will be a logic level one, thus mirroring the value of bit-32 of the interrupt pending register 58.

If all of the bits within the high order bits 60 of the interrupt pending register 58 are a logic level zero, then the output of ORing circuit 81 is a logic level zero and the least significant bit, the "flag/bit-32" bit, of interrupt flag register 62 will contain a logic level zero. As a consequence, the least significant bit of interrupt flag register 62 will act as a flag to CPU 12 indicating that the low order bits 59 of the interrupt pending register 58 have been stored in the interrupt flag register 62.

Thus bit-1 through bit-31 of the interrupt pending register 58 will be stored in bit-1 through bit-31 of the interrupt flag register 62. Also, multiplexers 84 will receive a logic level zero as a control signal input that will result in the low order bits 59 of interrupt pending register 58 being loaded into the corresponding bits of interrupt flag register 62, with the exception of the least significant bit of the low order bits 59 of interrupt pending register 58 which is not implemented. Note that bit-0 of the interrupt source register 50, the interrupt enable register 54, and the interrupt pending register 58 are not implemented in one embodiment of the present invention. Thus, there is no bit-0 of the interrupt pending register 58 to provide to the least significant bit of interrupt flag register 62. Note that if none of the high order bits 60 of the interrupt pending register 58 contain a logic level one, then the least significant bit (e.g. selection field 90) of the interrupt flag register 62 is used only as a flag and does not contain any other information to be provided to CPU 12.

Thus CPU reads the interrupt flag register 62 and uses the least significant bit 90 to determine whether the rest of the bits of interrupt flag register 62 contain information on interrupt request sources 1–31 or interrupt request sources 32–63.

All of the implemented low order bits 59 of interrupt pending register 58 are logically ORed together using ORing circuit 80. All of the high order bits 60 of interrupt pending register 58 are logically ORed together using ORing circuit 81. The outputs of ORing circuits 80 and 81 are provided as inputs to an ORing circuit 86. The output of ORing circuit 86 is an interrupt pending signal 92 which is provided to CPU 12.

The interrupt pending signal 92 is a logic level one if at least one bit within interrupt pending register 58 is a logic level one. CPU 12 uses the interrupt pending signal 92 to determine whether an interrupt is pending and needs to be processed. The software routine within CPU 12 used to perform interrupt processing will then read the interrupt flag register 62 and perform a find-first-one operation to determine which interrupt source 1–63 (see FIG. 2) has requested the pending interrupt and has the highest priority. CPU 12 uses the selection field 90 to determine whether information field 91 contains bit-1 through bit-31 of interrupt pending register 58, or alternately contains bit-33 through bit 63 of interrupt pending register 58. Note that if the selection field 90 indicates that the information field 91 contains bit-33 through bit-63, then the selection field 90 may also contains bit-32 of interrupt pending register 58. That is, if the selection field 90 indicates that the information field contains bit-33 through bit 63 of the interrupt pending register, and bit-33 through bit-63 of interrupt flag register 62 are all a logic level zero, then the flag value 90 and the value of bit-32 of the interrupt pending register 58 will be the same. In this case, the LSB of interrupt flag register 62 serves a dual purpose as a flag and as an information value.

Note that in alternate embodiments of the present invention, interrupt flag register 62 may or may not be implemented as an actual storage circuit. If the interrupt flag register 62 is not implemented as an actual storage circuit, then the output of ORing circuit 81 may be provided as the control input to multiplexers 84, which then select either the low order bits 59 or the high order bits 60 of the interrupt pending register 58. Note that the output of ORing circuit 81 not only provides the control for multiplexers 84, but also provides the value for the least significant bit (i.e., the selection field 90) of interrupt flag register 62. Again, interrupt flag circuit register 62 may not necessarily be implemented as latches or storage circuits, but may instead be implemented as conductors provided at the outputs of multiplexers 84 and the output of ORing circuit 81. Note, however, that even if interrupt flag register 62 does not require a storage circuit for its implementation, it nevertheless may exist as a register in the programmer's model, or as a register which may be accessible by CPU 12. Similarly, interrupt source register 50 and interrupt pending register 58 may not require storage circuits to be implemented. However, in order for interrupt enable register 54 to be user programmable, it needs some type of storage circuit to store the enable information programmed by the user.

Referring now to FIG. 3, in one embodiment, the interrupt flag register 62 contains a selection bit field 90 and an information bit field 91. In one embodiment of the present invention, the selection field 90 is implemented as the least significant bit or bit-0 of the interrupt flag register 62. Some embodiments of the present invention may use any number of bits within interrupt flag register 62 to implement selection field 90 as long as at least one bit is reserved for information field 91. If the selection field 90 contains a logic level one, then the information field 91 will contain bit-33 through bit-63 of interrupt pending register 58. If the selection field 90 contains a logic level zero, then the information field 91 will contain bit-1 through bit-31 of the interrupt pending register 58. Note that although the registers illustrated in FIGS. 2 and 3 have been illustrated as having a width of 32 bits, alternate embodiments of the present invention may use registers of any width.

Although the embodiment of the present invention illustrated in FIGS. 2 and 3 have shown registers 50, 54, and 58 being partitioned into two portions, namely a low portion 51, 55, 59 and a high portion 52, 56, 60, alternate embodiments of the present invention my use a partitioning into three portions, four portions, or any number of portions. The number of portions is limited only by the number of bits in interrupt flag register 62. As registers 50, 54, and 58 are partitioned into more portions, the selection field 90 in interrupt flag register 62 will contain an increasing number of bits. For example, if registers 50, 54, and 58 are partitioned into three portions, then selection field 90 in interrupt flag register 62 will require at least two bits.

Although the present invention has been described in detail in the context of interrupt handling, alternate embodiments of the present invention may be used in a wide variety of integrated circuit contexts other than interrupts. In fact, there are a wide variety of integrated circuit applications in which it may be useful to have one field of a register (e.g. selection field 90) determine the source of information stored in a second register field (e.g. information field 91). Similarly, there are a wide variety of integrated circuit applications in which it may be useful to have a register field (e.g. selection field 90) function as both a flag field and as an information or data field.

While the present invention has been illustrated and described with reference to specific embodiments, further modifications and improvements will occur to those skilled in the art. It is to be understood, therefore, that this invention is not limited to the particular forms illustrated and that the appended claims cover all modifications that do not depart from the scope of this invention.

What is claimed is:

1. An integrated circuit, comprising:
   a plurality of multisource registers; and
   a multifield register, coupled to the plurality of multisource registers, having a first field and a second field, wherein the first field identifies which of the plurality of multisource registers are loaded into the second field.

2. An integrated circuit of claim 1 wherein the plurality of multisource registers have bits which correspond to sources of interrupt requests.

3. The integrated circuit of claim 2, wherein each bit of the bits of the multisource registers is selectively set to indicate a presence of an interrupt request from its corresponding source.

4. The integrated circuit of claim 3 further comprising a plurality of ORing circuits coupled to the plurality of multisource registers which detect the presence of interrupt requests.

5. The integrated circuit of claim 4 further comprising a detection ORing circuit, coupled to the plurality of ORing circuits, having an output which provides an interrupt pending signal if one of the plurality of ORing circuits detects the presence of an interrupt request.

6. The integrated circuit of claim 5 wherein the plurality of multisource registers comprises a first multisource register and a second multisource register and the plurality of ORing circuits comprises a first ORing circuit coupled to the first multisource register and a second ORing circuit coupled to the second multisource register.

7. The integrated circuit of claim 6, wherein the first field is coupled to the first ORing circuit.

8. The integrated circuit of claim 7, wherein the first field comprises a bit which is set if any bit in the first multisource register is set.

9. The integrated circuit of claim 8, wherein the number of the bits in the first multisource register and the multifield register is the same.

10. The integrated circuit of claim 9 wherein the first multisource register has a least significant bit and wherein the first multisource register, except the least significant bit thereof, is loaded into the second field if the first multisource register has at least one bit set.

11. The integrated circuit of claim 1, further comprising an ORing circuit having inputs coupled to at least one of the plurality of multisource registers and having an output coupled to the first field.

12. In a processing unit, a method comprising the steps of:
   loading a first register with a first set of data bits which are asserted to represent a first set of interrupt requests;
   loading a second register with a second set of data bits which are asserted to represent a second set of interrupt requests; and
   if the first set of data bits contains any asserted bits, loading a first portion of a third register with a flag bit and a second portion of the third register with at least a portion of the first set of data bits.

13. The method of claim 12, wherein the first set of data bits comprise a number which is greater than the number comprised by the second set of data bits.

14. In an integrated circuit, a method comprising the steps of:
   defining a first field and a second field in a multifield register; and
   selectively loading one of a plurality of registers into the second field, wherein the first field determines the one of the plurality of registers.

15. The method of claim 14, wherein the first field identifies which register of the plurality of registers is loaded into the second field.

16. The method of claim 14, further comprising loading the first field with information which identifies which of the plurality of registers is loaded in the second field.

17. The method of claim 14, wherein one register of the plurality of registers has a same number of bits as the multifield register.

18. A processing unit having a bus structure of a predetermined number of bits, comprising:
   a first multisource register having the predetermined number of bits, one of which is a least significant bit, and a plurality of inputs coupled to sources of interrupts, wherein one of said plurality of inputs is coupled to the least significant bit;
   a second multisource register;
   an ORing circuit having inputs coupled to the first multisource register and having an output; and a multifield register of the predetermined number of bits having a first field and a second field, wherein the first field is coupled to the output of the ORing circuit and the second field is selectively loaded with the first multisource register, but not the least significant bit thereof, or with the second multisource register.

19. The processing unit of claim 18 wherein the second field is loaded with the first multisource register, but not the least significant bit thereof, if one of the predetermined number of bits of the first multisource register is set.

20. The processing unit of claim 18, wherein the second field is loaded with the second multisource register if none of the predetermined number of bits of the first multisource register are set.

* * * * *